United States Patent
Bickel et al.

(10) Patent No.: US 11,931,922 B2
(45) Date of Patent: Mar. 19, 2024

(54) METHOD FOR COMPUTATIONALLY DESIGNING A RE-USABLE TWO-PIECED MOLD

(71) Applicant: Institute of Science and Technology Austria, Klosterneuburg (AT)

(72) Inventors: Bernd Bickel, Klosterneuburg (AT); Thomas Auzinger, Klosterneuberg (AT); Kazutaka Nakashima, Tokyo (JP); Takeo Igarashi, Tokyo (JP)

(73) Assignee: Institute of Science and Technology Austria, Klosterneuburg (AT)

( * ) Notice: Subject to any disclaimer, the term of this patent is extended or adjusted under 35 U.S.C. 154(b) by 620 days.

(21) Appl. No.: 17/252,848

(22) PCT Filed: Jun. 21, 2019

(86) PCT No.: PCT/AT2019/060205
§ 371 (c)(1),
(2) Date: Dec. 16, 2020

(87) PCT Pub. No.: WO2019/241818
PCT Pub. Date: Dec. 26, 2019

(65) Prior Publication Data
US 2021/0187791 A1    Jun. 24, 2021

(30) Foreign Application Priority Data

Jun. 21, 2018  (AT) .............................. A 60090/2018

(51) Int. Cl.
*G06F 30/00*   (2020.01)
*B29C 33/38*   (2006.01)
*G06F 113/22*  (2020.01)

(52) U.S. Cl.
CPC .......... *B29C 33/3835* (2013.01); *G06F 30/00* (2020.01); *G06F 2113/22* (2020.01)

(58) Field of Classification Search
CPC ... B29C 33/3835; B29C 33/005; B29C 48/12; B29C 33/12; G06F 2113/22; G06F 30/00;
(Continued)

(56) References Cited

U.S. PATENT DOCUMENTS

2022/0032567 A1*  2/2022  Hernandez Hernandez ................
................................................................ B29D 35/142
2022/0405433 A1* 12/2022  Jost ......................... G06F 30/17

FOREIGN PATENT DOCUMENTS

EP          3301597 A1     4/2018

OTHER PUBLICATIONS

Malomo et al., FlexMolds: automatic design of flexible shells for molding, ACM Transactions on Graphicsvol. 35, Issue 611 Nov. 2016Article No. 223pp. 1-12, https://doi.org/10.1145/2980179.2982397 (Year: 2016).*

(Continued)

*Primary Examiner* — Darrin D Dunn
(74) *Attorney, Agent, or Firm* — Eversheds Sutherland (US) LLP

(57) ABSTRACT

The invention relates to a method for computationally designing a number of re-usable two-pieced molds for the reproduction of an object, wherein each mold is fillable with filling material, in particular resin, to form the object or a part of the object to be reproduced, wherein each mold consists of rigid material.

15 Claims, 2 Drawing Sheets

(58) Field of Classification Search
CPC .......... G06F 30/10; G06F 30/20; G06F 30/12; G06F 30/17; G05B 19/4097; G05B 2219/35013; G05B 2219/45244; G05B 2219/35134; B33Y 10/00; B33Y 50/00
See application file for complete search history.

(56) References Cited

OTHER PUBLICATIONS

Oded Stein, Alec Jacobson, Eitan Grinspun, Interactive design of castable shapes using two-piece rigid molds, Computers & Graphics, vol. 80, 2019, pp. 51-62, ISSN 0097-8493 (Year: 2019).*
Alderghi, Metamolds: computational design of silicone molds, ACM Transactions on Graphics, vol. 37, Issue 4, Jul. 2018, Article No. 136, 99 1-13 (Year: 2018).*
Search Report and Written Opinion for International Application No. PCT/AT2019/060205, dated Oct. 31, 2019; 12 pages.

* cited by examiner

METHOD FOR COMPUTATIONALLY DESIGNING A RE-USABLE TWO-PIECED MOLD

FIELD OF THE INVENTION AND DESCRIPTION OF PRIOR ART

The invention relates to a method for computationally designing a number of re-usable two-pieced molds for the reproduction of an object. Moreover, the invention relates to a two-pieced rigid mold, designed by the method according to the present invention.

Document EP 3 301 597 A1 describes a method for computationally designing re-usable flexible molds. Therein, an algorithm is described that allows to calculate the strain upon removal of the flexible mold, wherein the mold is openable along a parting line (also referred to as cut layout), wherein calculation and determination of an optimized parting line in view of the strain limitations of the object to be casted and the flexible mold-material takes place by applying an optimization algorithm.

While flexible molds allow the reproduction of complex object shapes, removal from the casted objects has to be performed with care in order to avoid damaging the mold or the object.

SUMMARY OF THE INVENTION

The present invention therefore has the objective to provide an alternative method for casting objects having a complex shape, or resemblances thereof, allowing increased economic feasibility.

This objective is achieved by means of a method for computationally designing at least one rigid re-usable two-pieced mold for the reproduction of a complex object or a resemblance thereof, wherein a complex object is an object for which no parting direction exists that allows non-destructive casting of said object with a single rigid two-pieced mold in a single-stepped extraction process, wherein each two-pieced mold is designed to enclose at least one cavity that is fillable with filling material, in particular resin, to form the complex object, a resemblance of the complex object, or a part of the complex object, namely a sub-object, to be reproduced within the mold, wherein each mold consists of rigid material, comprising the following steps:
  a) taking as an initial input a digital surface description of the object to be reproduced,
  b) manipulation of the digital surface description of step a) in order to obtain a feasible digital representation and consequently to calculate at least one feasible re-usable two-pieced mold, wherein a feasible digital representation is a representation that allows for each two-pieced mold a single-stepped non-destructive extraction process,
    b1) wherein the manipulation of the digital surface description is preformed by applying at least one of the following amendments to the digital surface description: {object deformation, split of the complex object into a number of sub-objects and as such increasing the number of molds, extending the complex object by adding at least one inset}, and
    b2) wherein the extent of manipulation according to step b1) is determined based on
      an optimization algorithm, and/or
      user-input preference data, and
    b3) wherein the optimization algorithm is applied to obtain at least one feasible two-pieced mold by way of calculating an optimized orientation and position of the object or sub-object within at least one feasible two-pieced mold and consequently to calculate the shape of each piece of each two-pieced mold and its parting line, wherein the parting line is defined as at least one closed curve in 3D space that is shaped when the two pieces of the mold and the cavity or the object within the mold meet one another,
  c) providing the at least one feasible two-pieced mold of step b) as an output.

By virtue of these features it is possible to allow cost efficient and highly scalable reproduction of said objects by using rigid two-pieced molds.

The digital surface description D of step a) comprises a digital representation of the surface of the object. An object could have more than one parting line. A torus that lies flat in the mold, for example, has an inner and an outer parting line. This is also the case, if a mold contains more than one object.

Exemplary features of the optimization algorithm OA are explained in the following.

In the following, an exemplary description of an optimization algorithm OA is given, wherein with the term "(OPTIONAL)" those steps of the algorithm are described that are preferably optional but can be advantageous. The term "(IMPLEMENTATION)" denotes parts that are specific to the exemplary paper but perhaps the overall goal can be reached differently. The algorithm OA tests different decompositions until the a sufficiently good solution is found, which means that the moldability energy becomes smaller than a threshold (for instance gamma>=0), that can be defined by a user.

It starts with a decomposition of the mold into two parts, and if necessary the object can be split into sub-objects (NP) until a solution is found.

For each part count NP, the algorithm (i.e. the optimization algorithm OA) can execute two stages: Coarse Shell Decomposition and Parting Line Computation.

Coarse Shell Decomposition: A partition of the digital surface description (D) into NP regions r with corresponding parting directions dr is found. These regions are chosen to best fulfil two objectives: (i) having surface normals that best align with the parting direction dr and (ii) minimizing self-overlap along the parting direction dr. As result, all of (D) is subdivided into NP regions. IMPLEMENTATION: For this, we grow the regions from random seed location on (D) and after the whole surface is subdivided into regions, the regions are regrown from the best seed location of each region.

Parting Line Computation: Each region from the previous step constitutes its own part that needs to be molded. For this, it has to be decided, which patch M+ of the part is touched by the upper and which patch M− is touched by the lower mold. These patches are chosen to best fulfil two objectives: (i) having surface normal that point either along the parting direction of the upper mold (for patch M+) or the lower mold (for patch M−) and (ii) each patch needs to be a connected component of the digital surface description (D). IMPLEMENTATION: For this, we employ graph cut-based classification of each part (which potentially generates more than 2 patches) and ensure that only 2 connected patches are generated by relabelling the patches into M+ and M−.

(OPTIONAL) Part Boundary Smoothing: If the boundaries of the individual parts are chosen as a subset of the edges of the primitives of the digital surface description (D), they might be jaggy. Alternatively, the boundaries can be chosen as 3D curves on the digital surface description (D). These boundaries are chosen to best fulfil two objectives: (i) providing parts that are well moldable (i.e., low EP(Pi)) and (ii) with smooth boundaries (i.e., low Esmooth). Here, the moldability energy EP is given by the overhang penalization EH (which penalizes surface locations that are oriented against the parting direction of their respective patch) and the overlap penalization EL (which penalizes the overlap of surface locations that are member of the same patch). The boundary smoothing energy (Esmooth) can be based on a measure of the geodesic curvature of the boundary curves. IMPLEMENTATION: For this, we employed an active contour model using snakes. The boundary smoothing energy is computed as the average angles between consecutive line segments of the boundary curves.

As a result, we obtain NP parts where each part has an upper M+ and lower M− patch that touch the respective pieces of a two-piece mold. These parts are assigned to NP (or less) molds, for which the geometry is generated automatically using volumetric Boolean operations.

(OPTIONAL) Moldability enforcement: If a threshold gamma larger than zero is chosen, resulting object or sub-objects might still exhibit small defects that prohibit non-destructive casting with two-piece rigid molds. Small local deformations might be used to remedy this. (IMPLEMENTATION) For this, we employ both as-rigid-as-possible transforms and boolean sweep volumes.

(OPTIONAL) The mold geometries can be augmented with runners (i.e., channels through which the casting material flows), ejectors (i.e., voids through which ejector pins are inserted), cooling channels, inset mechanisms (i.e., mechanisms which move insets), air vents (i.e., voids through which the air can escape), gates (i.e., connects between the part cavities and the runners), and other typical geometric features in mold design.

(OPTIONAL) The digital surface description (D) might be realized as a thin-shelled model. IMPLEMENTATION: For this, we precompute for each mesh triangle a prism by extruding it to the inside.

(OPTIONAL) Thin features might be handled separately to avoid cutting them into different parts (which would make it hard to glue them together).

(OPTIONAL) The algorithm can be run on a simplified version of the digital surface description (D) (which might omit fine details) to increase the performance of the algorithm. For this, the omitted features have to be restored before generating the mold geometry.

User-input preference data (U) can comprise the following:

There are several possibilities for user interactions, i.e. for including user preference data U:
  no-cut: The user specifies one or more regions on the digital surface description (D), to prevent the optimization algorithm (OA) from splitting the object (2) or sub-objects ( ) into such sub-objects in such a way that the one or more regions are split as well.
  Cut: The user specifies a curve along the digital surface description (D), such that the optimization algorithm splits the object (2) or sub-objects ( ) along this curve into sub-objects ( ).
  Merge: The user specifies two sub-objects ( ), which share a curve on the digital surface description (D) along their boundaries, which are then merged into a single sub-object ( ).
  Selective smoothing: The user specifies the boundary of a sub-object ( ) or part of it, which is then straightened by locally increasing the weight w1 of the smooth moldability energy function.

There are also overall parameters that the user can set.
  w1 encodes the user preference of having smooth boundaries between sub-objects.
  wH encodes the user preference of avoiding regions that have a normal nearly orthogonal to the parting direction (i.e., less than the angle phi).
  wL encodes the user preference of avoiding overhangs.
  omega encodes the user preference for the thickness of the shell.
  gamma encodes the user preference for the maximal violation of the preferences weighted by wH and wL. If the associated energy exceeds this threshold, the optimization algorithm (OA) looks for alternatives (e.g., split into more sub-objects, insertion of more insets).

Preferably, the curve C of the parting line is a curve that does not lie entirely within a single plane.

Advantageously, in step b3) the optimization algorithm OA is configured to calculate the position and orientation of the object or sub-object in a manner to enable anti-parallel parting directions.

Preferably, the optimization algorithm OA is configured to allow during steps b1) to b3) interaction with a user by providing the user with information related to the proposed curve of the parting line and consequently the boundaries between the two pieces of each proposed mold, allowing repositioning of the curve of the parting line and thus causing recalculation according to step b3).

Advantageously, the object is split into a number of sub-objects.

Preferably, each sub-object is designed as a shell, said shell representing a part of the surface of the object to be reproduced, wherein the sub-objects are connectable to one another in order to shape a closed surface representing the surface of the object to be reproduced, said closed surface enclosing at least one hollow space (see also "thin shell generation").

Advantageously, the calculations according to steps b1) to b3) are at first performed on a simplified representation of the object having lower resolution and once a solution for the simplified representation is obtained, this solution is used as a starting point for yet another calculation according to steps b1 to b3) based on a high resolution representation.

Preferably, the calculated curve of the parting line is automatically smoothened prior to providing the design of the mold according to step c).

Advantageously, the optimization algorithm OA calculates a feasible number and position of openings, in particular runner structures, for filling each two-pieced mold.

(OPTIONAL) The mold geometries can be augmented with runners (i.e., channels through which the casting material flows), ejectors (i.e., voids through which ejector pins are inserted), cooling channels, inset mechanisms (i.e., mechanisms which move insets), air vents (i.e., voids through which the air can escape), gates (i.e., connects between the part cavities and the runners), and other typical geometric features in mold design.

Moreover, the invention also relates to a method for reproduction of a complex object by using a mold designed in accordance to the invention, wherein the feasible rigid two-pieced mold according to step c) is produced by milling or 3D-printing.

Preferably, the sub-objects are molded using the corresponding two-pieced molds, wherein after molding, these sub-objects are fixed to one another in order to resemble the complex object.

The invention also relates to a rigid re-usable two-pieced mold designed by the method according to the invention and a complex object reproduced by a method according to the invention.

In the following, the invention is also described in other words:

The invention relates to a method for computationally designing a number of re-usable two-pieced molds for the reproduction of an object, wherein each two-pieced mold is designed to enclose at least one cavity that is fillable with filling material, in particular resin, to form the object or a part of the object to be reproduced, wherein each mold consists of rigid material, comprising the following steps:
   a) taking as an initial input a digital surface description of the object to be reproduced,
   b) calculating the feasibility of non-destructive casting of the object or a sub-object by using a single two-pieced mold by simulating the extraction process of the mold based on an optimization algorithm, said algorithm determining and evaluating the boundaries between the two pieces of the mold,
   c) yielding a set of feasible two-pieced molds, wherein the set of feasible two-pieced molds is determined in dependence of the calculation of step b) as follows:
      if the single two-pieced mold is feasible, the set of feasible two-pieced molds equals the single two-pieced mold,
      if the single two-pieced mold is not feasible, the object is split into a number of sub-objects, wherein the optimization algorithm calculates a lowest feasible number of sub-objects, wherein each sub-object is matched with a feasible two-pieced mold according to step b), wherein the set of feasible two-pieced molds comprises the number of feasible two-pieced molds,
   d) providing the set of feasible two-pieced molds as an output.

A two-pieced mold can enclose either one, two, three or more cavities. The number of cavities depends on the object and practical limitations of mold design and can be chosen properly by a person skilled in the art in dependence of the object to be reproduced. The algorithm enables according to step c) allows to minimize the number of sub-objects and therefore the number of molds needed in order to cast a complex object. However, this minimization does not necessarily represent an absolute minimum. First, determining an absolute minimum can in some cases exceed the calculation capabilities of practical computer based modelling and optimization. And second, such an absolute minimum may have drawbacks in terms of casting procedure or mold design. Therefore, the algorithm is designed to provide a lowest number, that is still feasible. Moreover, the determination of such a lowest feasible number can also include external inputs like user preference data.

The entire number of re-usable molds is contained in the set of feasible molds. This number varies depending on the object to be casted and potentially constraints set by a interacting user. For instance, this number can be any natural number (positive integers) between 1 and 30, for instance 1, 2, 3, 4, 5, etc.

Preferably, the optimization algorithm can allow interaction with a user by providing the user with information related to the proposed boundaries between the two pieces of each mold and by allowing repositioning of these boundaries and recalculation according to steps b) and c).

Moreover, the surface description according step a) can comprise a representation of a closed surface mesh of the object, said initial closed surface mesh being aligned with surface of the object to be reproduced, said initial closed mesh being partitioned into a set comprising a plurality of initial patches, whose boundaries provide a feasible initial cut layout. This cut layout is associated with the boundaries between mold pieces. The object can be hollow and/or comprise holes.

The term "non-destructive casting" means that neither the mold nor the object is destroyed during the casting procedure.

Moreover, step c) can comprise a simulation of the extraction process that includes the steps of
   determining an extraction path of each patch and the forces applied therein on each patch, and
   calculating the maximum strain for each patch and comparing the maximum strain with a threshold, wherein threshold represents a maximum strain for a selectable material having a selectable wall thickness and
   verifying the extraction process based on step b) by comparing the maximum strain of each patch with a threshold and providing the result of the verification as an output.

BRIEF DESCRIPTION OF THE DRAWINGS

In the following, in order to further demonstrate the present invention, illustrative and non-restrictive embodiments are discussed, as shown in the drawings, which show.

DETAILED DESCRIPTION OF EMBODIMENTS OF THE INVENTION

In the following, identical reference signs used in the figures depict identical features if not stated otherwise. Reference is also made to the drawings and description disclosed in the attached document "CoreCavity: Interactive Shell Decomposition for Fabrication with Two-Piece Rigid Molds", said document being hereby incorporated by reference.

Figure 1:
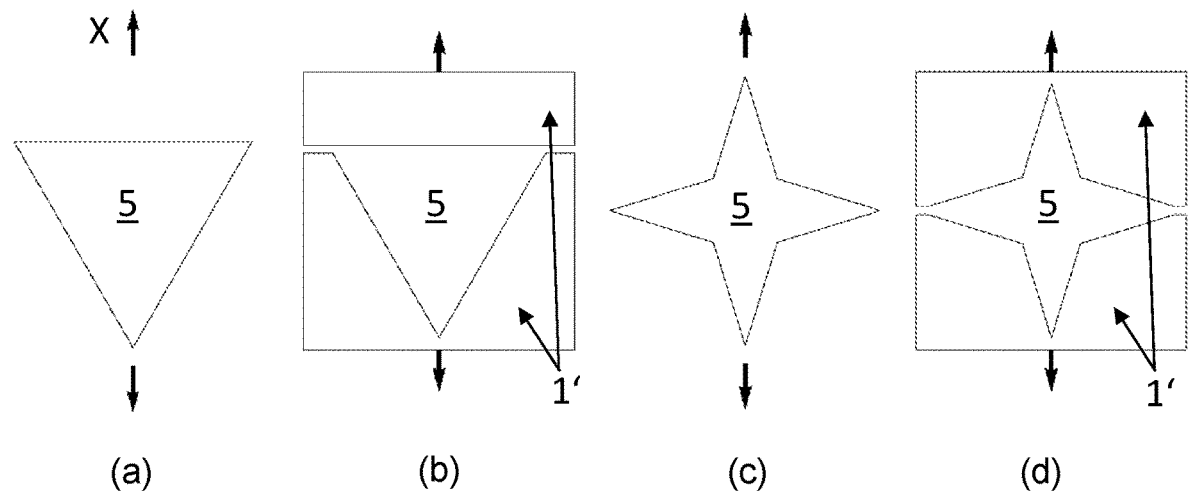
FIG. 1a to FIG. 1d exemplary embodiments of non-complex objects allowing a single-stepped extraction process when molded within a two-pieced mold according to the state of the art, FIG. 2a an exemplary complex object, for which the present invention provides a solution for molded reproduction, FIG. 2b an exemplary split of the complex object into two non-complex sub-objects, FIG. 2c a deformation of the complex object into a non-complex object, FIG. 2d addition of insets turning the overall object shape into a non-complex object, FIG. 3a to d exemplary two-pieced molds for the objects according to FIGS. 2b to 2d, and FIG. 4 a schematic diagram showing the relevant steps of the method according to the invention.

FIG. 1a shows an object 5 wherein an anti-parallel parting direction X exists when casting the object within a rigid mold. FIG. 1b shows exemplary parting directions of an exemplary two-pieced mold 1' enclosing the object 5 of FIG. 1a. FIGS. 1c and 1d show another exemplary object 5 having and a corresponding two-pieced mold 1' allowing for an anti-parallel parting direction. Both objects shown in these figures are not complex objects in the sense of the present invention since an antiparallel parting direction exits for the two-pieced mold that allows non-destructive removal of the mold in a single extraction step.

Figure 2:
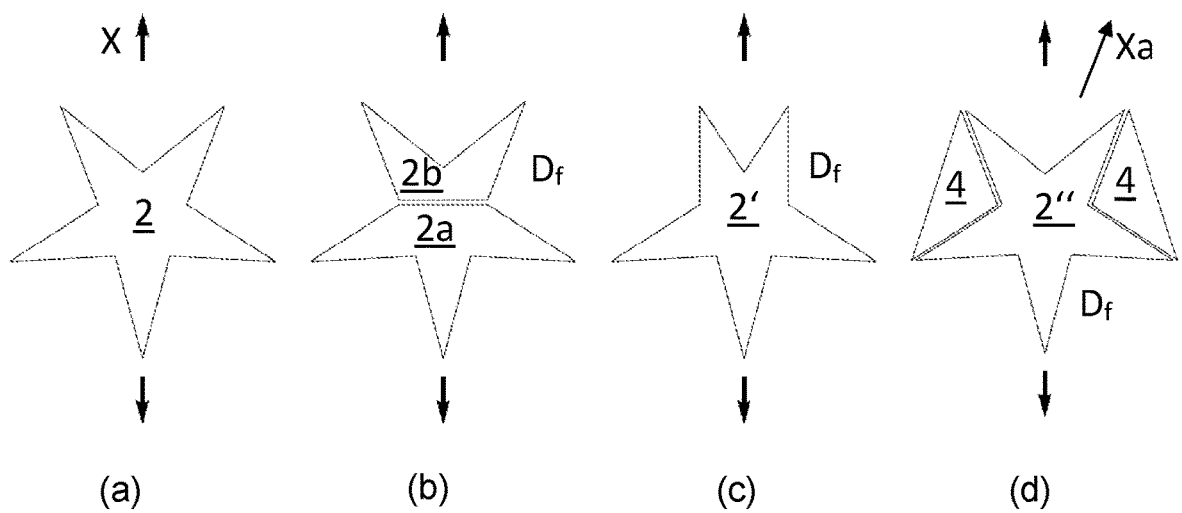

FIG. 2a shows an exemplary complex object 2, for which no parting direction exists that allows non-destructive casting of said object 2 within a rigid two-pieced mold in a single-stepped extraction process. This definition does not require that no multi-stepped extraction process exists that can involve removal of additional objects for instance in different directions.

Figure 3:
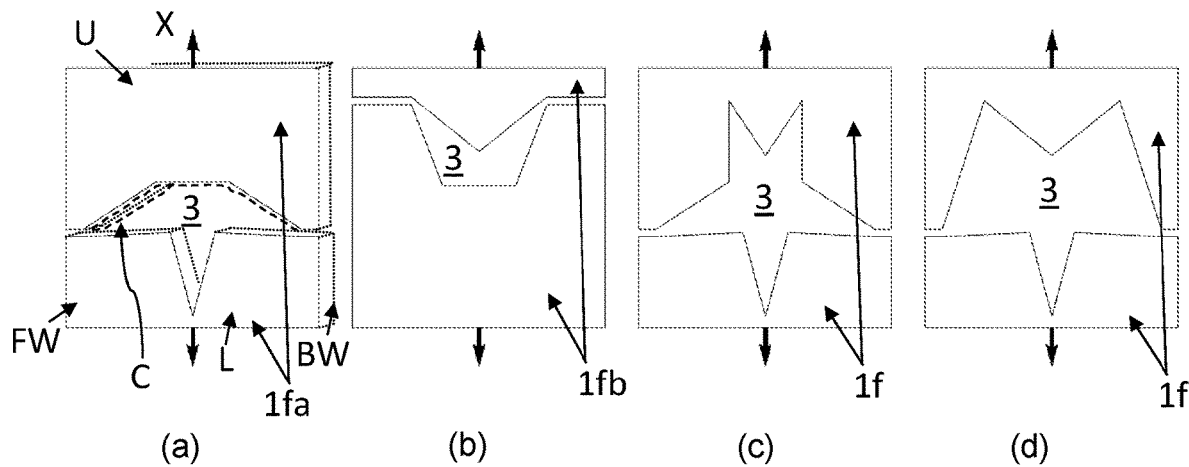

FIG. 2b shows one option to enable casting the complex object 2, namely by intelligent split of the object 2 into two sub-objects 2a and 2b. Both sub-objects 2a and 2b are selected in a manner that each can be molded within a two-pieced mold 1a and 1b. These molds 1a and 1b are shown in FIGS. 3a and 3b.

Figure 4:
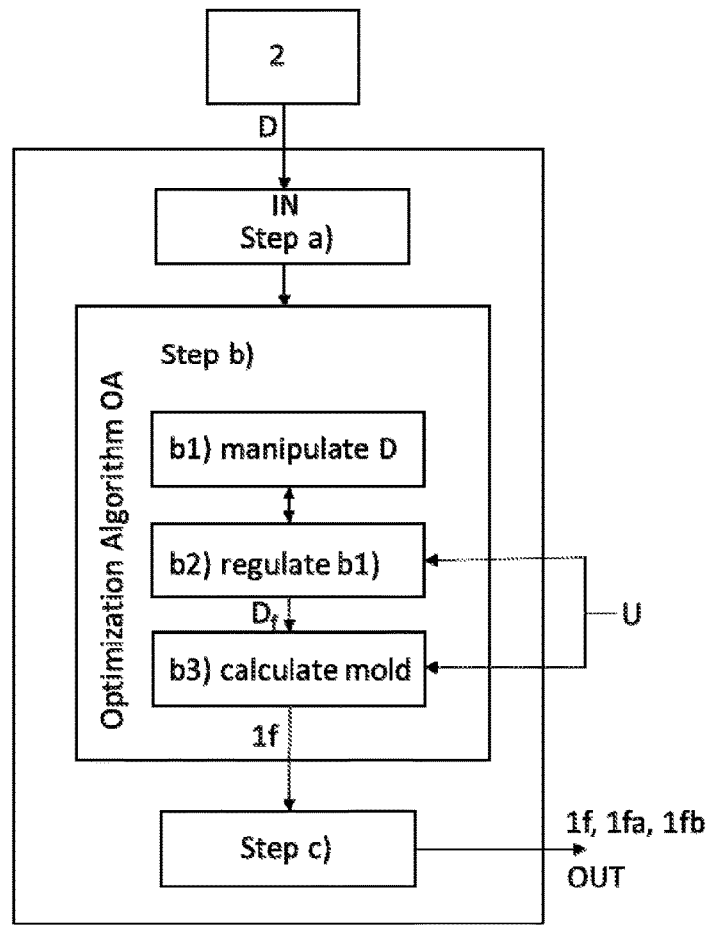

Since the invention relates to a method for computationally designing the respective two-pieced mold 1 or 1a and 1b, a digital surface description D of the object 2 is provided as a digital input IN in a first step a) (see FIG. 4). Splitting the object 2 is only one way to enable a reproduction by using a two-pieced rigid mold 1 or 1a and 1b. Speaking more generally, the invention includes manipulation of the digital surface description D of step a) in order to obtain a feasible digital representation Df (see FIG. 4) and consequently to calculate at least one feasible re-usable two-pieced mold 1f, wherein a feasible digital representation Df is a representation that allows for each two-pieced mold a single-stepped non-destructive extraction process.

FIGS. 2b to 2d show such feasible digital representations Df. As mentioned before, FIG. 2b shows the manipulation of the digital surface description D by split of the initially complex object 2 into non-complex two sub-objects 2a and 2b. Of course it is possible to split the object 2 also into more than two sub-objects. However, in order to minimize the production efforts and costs it is advantageous to keep the number of sub-objects minimal. Calculation and evaluation of the split is performed by an optimization algorithm OA, which is disclosed in detail within the attached paper. The algorithm for splitting the object into sub-object is in detail described in section 4.3 of the paper ("Coarse Shell Decomposition").

Additional or by alternative the complex object 2 could also be amended into a non-complex object by a applying object deformation as shown in FIG. 2c. This manipulation is advantageous when minor amendments are already sufficient to turn a complex object 2 into a moldable non-complex object. The necessary amendments and its evaluation can also be performed by the optimization algorithm.

Additional or by alternative the complex object 2 could also be amended by extending the object by adding at least one so called inset 4 (see FIG. 2d), said inset 4 extending the shape of the complex object 2 in a manner that turns the complex object 2 in an extended non-complex object 2". An inset 4 is an object that is added into the two-pieced mold during the casting procedure and that can be removed from the complex object 2 afterwards. The inset 4 can be designed as a reusable object or as an object that is destroyed during the process of removal. In the example of FIG. 2d, two insets are added, thus allowing anti-parallel parting directions. However, if non-anti-parallel parting directions are possible, the inset 4 on the right side of the object could be skipped when the parting direction is amended into the direction Xa. Since large scale molding devices used for industrial applications usually only allow for anti-parallel parting directions, adding two insets 4 can be favourable.

FIG. 4 shows a schematic diagram showing the relevant steps of the method according to the invention. For all the three above mentioned manipulation options the extent of manipulation according to step b1) is determined in step b2) based on an optimization algorithm OA, and/or user-input preference data U. Moreover, in an additional step b3) the optimization algorithm OA is applied to obtain at least one feasible two-pieced mold 1f, 1fa, 1fb by way of calculating an optimized orientation and position of the object 2 or sub-object 2a, 2b within at least one feasible two-pieced mold 1, 1fa, 1fb and consequently to calculate the shape of each piece of each two-pieced mold 1f and its parting line. The parting line is defined as at least one closed curve C in 3D space that is shaped when the two pieces U, L of the mold 1f, 1fa, 1fb and a cavity 3 (see FIG. 3a) or the object 2 within the mold 1 meet one another.

In a final step c) the at least one feasible two-pieced mold 1f, 1fa, 1fb of step b) is provided as an output OUT. Of course, the object can have openings thus demanding more than one departing line and a corresponding curve between the mold pieces and the object to be reproduced.

FIG. 3a to d show exemplary two-pieced molds for the objects according to FIGS. 2b to 2d, and It is clear to a person skilled in the art that at least one of the mold pieces (upper piece U and lower piece L), preferably the upper piece U, will be provided with openings (so called runner structures) allowing to pour the curing material, in particular resin, into the mold.

FIG. 3a also shows dotted lines that should draw the readers attention to the fact that although the remaining figures show only two dimensional representations of objects, the objects 2 themselves have a spatial dimension. In practice, the pieces of the mold will almost entirely enclose a cavity 3 with the exception of openings for filling the resin and for release of air trapped within the cavity 3. Therefore, for instance the lower piece L of the mold 1fa can extend vertically on the back and front side forming a cavity itself enclosing the upper piece U of the mold (not shown in the figures). In other words, the front wall FW and the back wall BW can be extended upward hence enclosing the upper piece U of the mold 1fa. One the resin is poured into a—for instance vertical opening in the upper piece U extending towards the cavity 3, the cavity 3 will be filled with the resin and the departing line will extend along a curve C (schematically depicted with a dashed line) that follows edges of the upper piece U that will contact the resin and the lower piece L. As can be seen from the example of FIG. 3a, the curve C extends not just horizontally but also diagonally and orthogonally. The curve C of the parting line is a curve that does not lie entirely within a single plane. Contrary, the present invention allows complex shapes of the curve C and utilizes this features to optimize the design of the mold.

Consequently, in step b3) the optimization algorithm OA is preferably configured to calculate the position and orientation of the object 2 or sub-object 2a, 2b in a manner to enable anti-parallel parting directions X. Moreover, the optimization algorithm OA is preferably configured to allow during steps b1) to b3) interaction with a user by providing the user with information related to the proposed curve C of the parting line and consequently the boundaries between the two pieces L, U of each proposed mold 1fa, allowing repositioning of the curve C of the parting line and thus causing recalculation according to step b3).

As can be seen for instance from FIGS. 1, 5, 11 and 12 of the paper, the complex object can be hollow and thus the molding procedure is directed to produce shells which are then connected to one another to reproduce the object. Each sub-object 2a, 2b is in this case designed as a shell, said shell representing a part of the surface of the object to be reproduced, wherein the sub-objects are connectable to one another in order to shape a closed surface representing the surface of the object to be reproduced, said closed surface enclosing at least one hollow space ("thin shell generation").

In order to optimize the processing speed and minimize the required processing power of the method, the calculation according to steps b1) to b3) can be at first performed on a simplified representation Slow of the object 2 having lower resolution and once a solution for the simplified representation Slow is obtained, this solution is used as a starting point for yet another calculation according to steps b1 to b3) based on a high resolution representation Sinput.

Moreover, the calculated curve C of the parting line can be automatically smoothened prior to providing the design of the mold 1f, 1fa, 1fb according to step c).

The optimization algorithm OA can also calculate a feasible number and position of openings, in particular runner structures, for filling each two-pieced mold 1f. In other words, the mold geometries can be augmented with runners (i.e., channels through which the casting material flows), ejectors (i.e., voids through which ejector pins are inserted), cooling channels, inset mechanisms (i.e., mechanisms which move insets), air vents (i.e., voids through which the air can escape), gates (i.e., connects between the part cavities and the runners), and other typical geometric features in mold design.

Moreover, the invention also relates to a method for reproduction of a complex object (2) by using a mold designed in accordance to the above described method for designing molds. Therein, the feasible rigid two-pieced mold 1f, 1fa, 1fb according to step c) can be produced by subtractive or additive manufacturing, in particular milling, 3D-printing or laser sintering. Moreover, the sub-objects 2a, 2b can be molded using the corresponding two-pieced molds 1fa, 1fb, wherein after molding, these sub-objects 2a, 2b are fixed to one another in order to resemble the complex object 2.

The invention claimed is:

1. A method for computationally designing and producing at least one rigid re-usable two-pieced mold (1, 1a, 1b) for the reproduction of a complex object (2) or a resemblance (2') thereof, wherein the complex object (2) is an object for which no parting direction (X) exists that allows non-destructive casting of said object (2) with a single rigid two-pieced mold (1, 1a, 1b) in a single-stepped extraction process, wherein each two-pieced mold (1, 1a, 1b) is designed to enclose at least one cavity (3) that is fillable with filling material to form the complex object (2), a resemblance (2') of the complex object (2), or a part of the complex object (2), namely a sub-object (2a, 2b), to be reproduced within the mold (1, 1a, 1b), wherein each mold (1, 1a, 1b) consists of a rigid material, the method comprising the following steps:
  a) taking as an initial input (IN) a digital surface description (D) of the complex object (2) to be reproduced;
  b) manipulating the digital surface description (D) of step a) in order to obtain a feasible digital representation (Df) and consequently calculating at least one feasible re-usable two-pieced mold (1f), wherein a feasible digital representation (Df) is a representation that allows for each two-pieced mold (1, 1a, 1b) a single-stepped non-destructive extraction process,
    b1) wherein the manipulation of the digital surface description (D) is performed by applying at least one of the following amendments to the digital surface description (D): {object deformation, split of the complex object (2) into a number of sub-objects (2a, 2b) and as such increasing the number of molds (1a, 1b), extending the complex object (2) by adding at least one inset (4)}, and
    b2) wherein the extent of manipulation according to step b1) is determined based on
      an optimization algorithm (OA), and/or
      user-input preference data (U), and
    b3) wherein the optimization algorithm (OA) is applied to obtain at least one feasible two-pieced mold (1f, 1fa, 1fb) by way of calculating an optimized orientation and position of the object (2) or sub-object (2a, 2b) within at least one feasible two-pieced mold (1, 1fa, 1fb) and consequently to calculate the shape of each piece of each two-pieced mold (1f) and its parting line, wherein the parting line is defined as at least one closed curve (C) in 3D space that is shaped when the two pieces (U, L) of the mold (1f, 1fa, 1fb) and the cavity (3) or the object (2) within the mold (1) meet one another;
  c) manufacturing to produce the at least one feasible two-pieced mold ((1f, 1fa, 1fb) of step b) as an output (OUT).

2. The method according to claim 1, wherein the curve (C) of the parting line is a curve that does not lie entirely within a single plane.

3. The method according to claim 1, wherein in step b3) the optimization algorithm (OA) is configured to calculate the position and orientation of the object (2) or sub-object (2a, 2b) in a manner to enable anti-parallel parting directions (X).

4. The method according to claim 1, wherein the optimization algorithm (OA) is configured to allow during steps b1) to b3) interaction with a user by providing the user with information related to the proposed curve (C) of the parting line and consequently the boundaries between the two pieces (L, U) of each proposed mold (1fa), allowing repositioning of the curve (C) of the parting line and thus causing recalculation according to step b3).

5. The method according to claim 1, wherein the object (2) is split into a number of sub-objects (2a, 2b).

6. The method according to claim 5, wherein each sub-object (2a, 2b) is designed as a shell, said shell representing a part of the surface of the object to be reproduced, wherein the sub-objects are connectable to one another in order to shape a closed surface representing the surface of the object (2) to be reproduced, said closed surface enclosing at least one hollow space.

7. The method according to claim 5, wherein the calculations according to steps b1) to b3) are at first performed on a representation (Slow) of the object (2) having lower resolution and once a solution for the representation (Slow) is obtained, this solution is used as a starting point for yet another calculation according to steps b1) to b3) based on a high resolution representation (Sinput).

8. The method according to claim 1, wherein the calculated curve (C) of the parting line is automatically smoothened prior to providing the design of the mold (1f, 1fa, 1fb) according to step c).

9. The method according to claim 1, wherein the optimization algorithm (OA) calculates a feasible number and position of openings comprising runner structures, for filling each two-pieced mold (1f).

10. A method for reproduction of a complex object (2) by using a mold designed in accordance-with claim 1, wherein the feasible rigid two-pieced mold (1*f*, 1*fa*, 1*fb*) according to step c) is produced by subtractive or additive manufacturing.

11. The method according to claim 10, wherein sub-objects (2*a*, 2*b*) are molded using the corresponding two-pieced molds (1*fa*, 1*fb*), wherein after molding, these sub-objects (2*a*, 2*b*) are fixed to one another in order to resemble the complex object (2).

12. The method of claim 1 wherein the at least one feasible two-pieced mold is a rigid, re-usable two-pieced mold (1*f*, 1*fa*, 1*fb*).

13. The method of claim 10, further comprising producing a complex object (2) from the at least one feasible two-pieced mold.

14. The method of claim 1, wherein the filling material comprises a resin.

15. The method according to claim 10, wherein the subtractive or additive manufacturing comprises milling, 3D-printing, or laser sintering.

\* \* \* \* \*